United States Patent [19]

Lin et al.

[11] Patent Number: 5,204,521
[45] Date of Patent: Apr. 20, 1993

[54] GAAS-BASED OPTOELECTRONIC NEURONS

[75] Inventors: Steven H. Lin, Temple City, Calif.; Jae H. Kim, Bellevue, Wash.; Demetri Psaltis, Pasadena, Calif.

[73] Assignee: The United States of America as represented by the Administrator of the National Aeronautics and Space Administration, Washington, D.C.

[21] Appl. No.: 845,283

[22] Filed: Mar. 3, 1992

[51] Int. Cl.$^5$ .............................................. H01J 31/50
[52] U.S. Cl. .............................. 250/214 LS; 307/201; 250/551
[58] Field of Search ........................... 250/213 A, 551; 307/201, 311, 446, 448; 395/25; 364/822

[56] References Cited

U.S. PATENT DOCUMENTS 4,951,239  8/1990  Andes et al. ...................... 364/807
4,956,564  9/1990  Holler et al. ...................... 307/201
5,130,563  7/1992  Nabet et al. ...................... 307/201

Primary Examiner—David C. Nelms
Assistant Examiner—T. Davenport
Attorney, Agent, or Firm—John H. Kusmiss; Thomas H. Jones; Guy M. Miller

[57] ABSTRACT

An integrated, optoelectronic, variable thresholding neuron implemented monolithically in a GaAs integrated circuit and exhibiting high differential optical gain and low power consumption. Two alternative embodiments each comprise an LED monolithically integrated with a detector and two transistors. One of the transistors is responsive to a bias voltage applied to its gate for varying the threshold of the neuron. One embodiment is implemented as an LED monolithically integrated with a double heterojunction bipolar phototransistor (detector) and two metal semiconductor field-effect transistors (MESFET's) on a single GaAs substrate and another embodiment is implemented as an LED monolithically integrated with three MESFET's (one of which is an optical FET detector) on a single GaAs substrate. The first noted embodiment exhibits a differential optical gain of 6 and an optical switching energy of 10 pJ. The second embodiment has a differential optical gain of 80 and an optical switching energy or 38 pJ. Power consumption is 2.4 mW and 1.8 mW, respectively. Input "light" power needed to turn on the LED is 2 $\mu$W and 54 nW, respectively. In both embodiments the detector is in series with a biasing MESFET and saturates the other MESFET upon detecting light above a threshold level. The saturated MESFET turns on the LED. Voltage applied to the biasing MESFET gate, controls the threshold.

16 Claims, 3 Drawing Sheets

GAAS-BASED OPTOELECTRONIC NEURONS

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates generally to integrated optoelectronic thresholding devices and more specifically to optoelectronic neurons, implemented monolithically as optoelectronic integrated circuits to be used for a compact realization of optoelectronic building blocks of neural networks.

BACKGROUND ART

The optical implementation of a neural network consists of two basic components: a two-dimensional array of neurons and interconnections. Each neuron is a nonlinear processing element that, in its simplest form, produces an output which is the thresholded version of the input. Liquid crystal spatial light modulators are candidates for such a two-dimensional array of neurons. However, they are not flexible in their use. Optoelectronic integrated circuits (OEIC's), either hybrid, such as liquid crystal on silicon, Si-PLZT, and flip-chip devices, or monolithic integration in III–V compounds, are another solution. In order for these devices to be used as neurons in a practical experiment, they must be large in number ($10^4/cm^2$–$10^6/cm^2$) and exhibit high gain. This puts a stringent requirement on the electrical power dissipation. Thus, these devices have to be operated at low enough current levels so that the power dissipation on the chip does not exceed the heat-sinking capability, and yet the current levels need to be large enough to be able to produce high gain. This means sensitive input devices are a must. To achieve these goals, the speed requirement of the devices must be relaxed as the operation of neural network does not have to be too fast.

STATEMENT OF THE INVENTION

The present invention comprises an optoelectronic thresholding device which in one embodiment is implemented as an LED monolithically integrated with a double heterojunction bipolar phototransistor (detector) and two metal semiconductor field-effect transistors (MESFET's) on a single GaAs substrate and another embodiment is implemented as an LED monolithically integrated with three MESFET's (one of which is an optical FET detector) on a single GaAs substrate. The first noted embodiment exhibits a different optical gain of 6 and an optical switching energy of 10 pJ. The second embodiment has a differential optical gain of 80 and an optical switching energy of 38 pJ. Power consumption is 2.4 mW and 1.8 mW, respectively. Input "light" power needed to turn on the LED is 2 $\mu$W and 54 nW, respectively. In both embodiments the detector is in series with a biasing MESFET and saturates the other MESFET upon detecting light above a threshold level. The saturated MESFET turns on the LED. Voltage applied to the biasing MESFET gate, controls the threshold.

OBJECTS OF THE INVENTION

It is a principal object of the invention to provide an optoelectronic neuron having a large differential optical gain and a low electrical power consumption.

It is an additional object of the invention to provide an optoelectronic neuron that is implemented as an LED monolithically integrated with a detector and a pair of transistor amplifiers on a GaAs substrate.

It is still an additional object of the invention to provide an optoelectronic neuron having an adjustable threshold, a high optical gain and a monolithic GaAs-based structure exhibiting low power consumption.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF THE INVENTION

Figure 1:
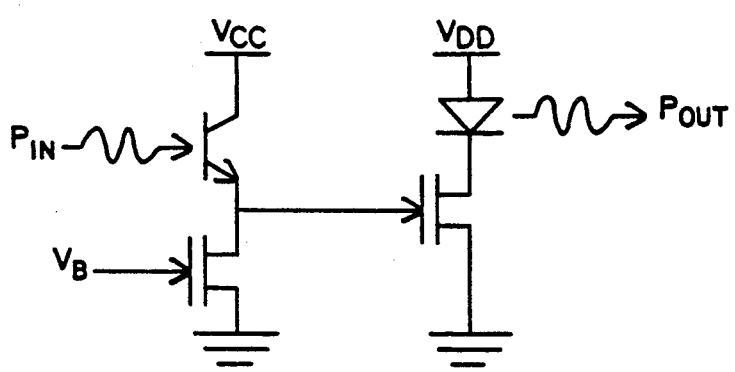
FIG. 1 is a schematic illustration of a first embodiment of the invention.

The present invention comprises an optoelectronic neuron that monolithically integrates a detector, 2 transistor amplifiers, and a light source on a single GaAs substrate. LED's have been chosen as the light source, as opposed to lasers, because no threshold currents are needed to drive the LED's so that a large array of neurons at low currents is possible and LED's are inherently simpler to fabricate. The circuit diagram of a first embodiment of the optoelectronic neuron of the invention is shown schematically in FIG. 1. A switching circuit at the input is formed by connecting a double heterojunction bipolar phototransistor in series with a biasing MESFET. Upon detecting enough incoming light, the phototransistor becomes saturated, thus pulling up the source-drain voltage across the biasing MESFET. This voltage turns on the other MESFET, which, in turn, drives the LED to emit light. The input thresholding characteristics are controlled by the gate voltage, $V_B$, of the biasing MESFET. The larger the $V_B$ is, the larger the threshold is because the photocurrent generated by the phototransistor has to satisfy the current drawn by the biasing MESFET before the excess current can flow to the gate of the LED-driving MESFET and charge up its gate. The output saturation is provided by the finite swing of the gate voltage in the driving MESFET. The differential gain of the neuron before becoming saturated is determined by the slopes in the I–V curves of the phototransistor and the biasing MESFET. If the slopes for these two transistors are zero, the differential gain in the neuron would be infinite. Thus, by minimizing these slopes, such an integrated optoelectronic neuron is capable of turning on the neuron at very low input light levels. This is essential for systems, such as neural networks, that require large gains, large number of neurons, and yet low enough power dissipation on the chip.

Figure 2:
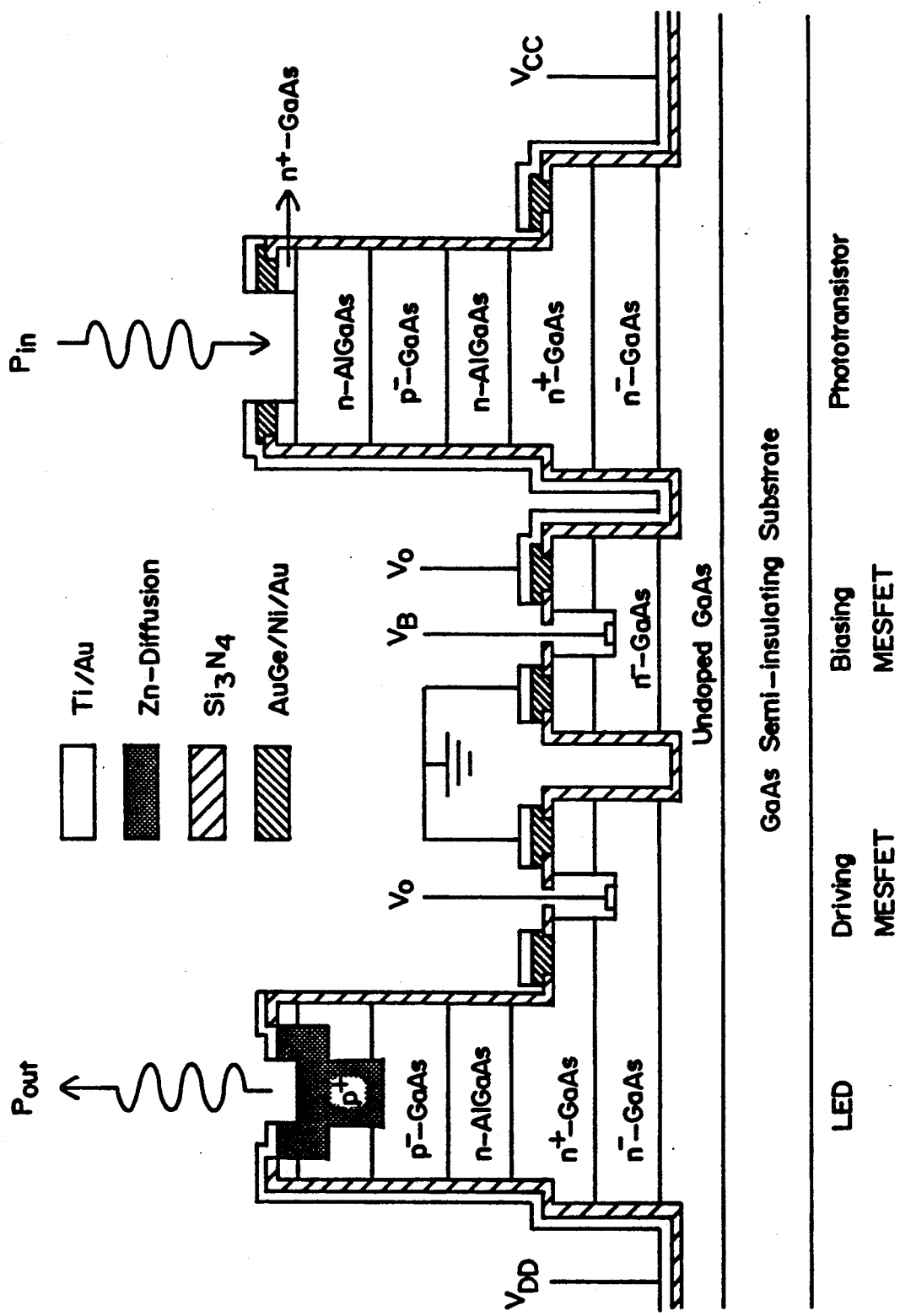
FIG. 2 is a cross-sectional view of the monolithic structure of the present invention.

The cross section of the optoelectronic neuron is shown in FIG. 2. The epitaxial layers are grown by MOCVD. Upon standard substrate cleaning processes, the substrate is subjected to two chemical wet etchings in defining each device in a neuron and isolating the adjacent neurons. A Zn-diffusion down to the active p-GaAs layer through a 1000 Angstrom-thick $Si_3N_4$ mask is then followed to form a double heterojunction LED. Another shallower, yet wider Zn-diffusion is performed to aid the current flow through the LED so that the emitted light is not under the evaporated metals of the LED. Appropriate windows are subsequently opened for all AuGe/Ni/Au n-type contact evaporations, and are followed by proper alloying. The gates of the MESFET's are recessed from the surface and are defined by etching and measuring the source-drain currents at the same time. Once the proper recessed depths for the gates are determined, Ti/Au are evaporated to form the gates and also to interconnect the devices. The size of a fabricated optoelectronic neuron is about $200\times200$ $\mu m^2$. The gates for the biasing and driving MESFET's are measured to be $6\times70$ $\mu m^2$ and $6\times100$ $\mu m^2$. The LED and the phototransistor light-sensitive areas are $40\times40$ $\mu m^2$ and $80\times60$ $\mu m^2$, respectively.

Figure 3:
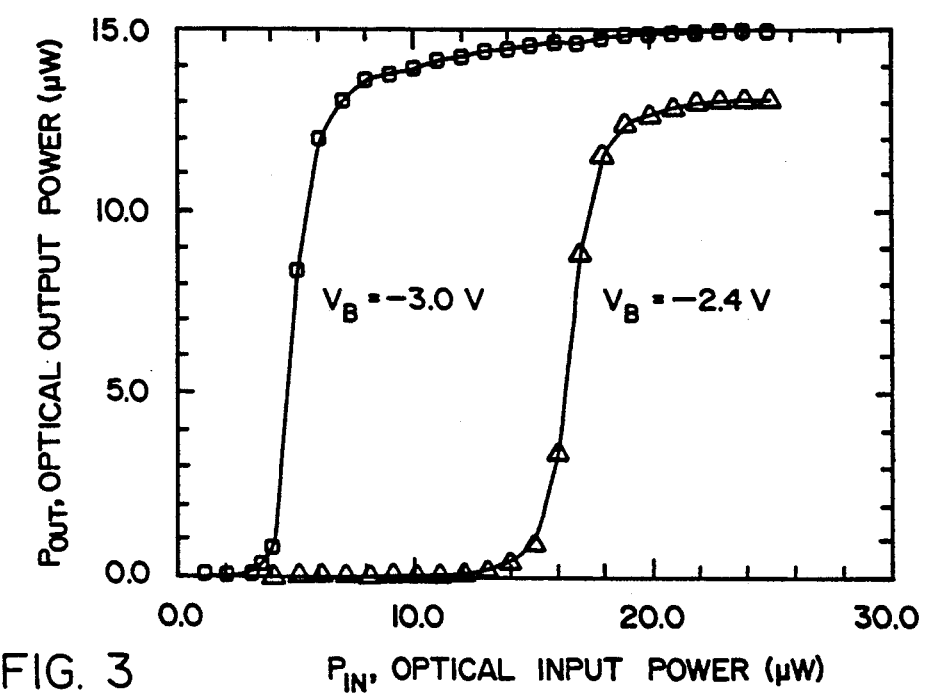
FIG. 3 is a graph of optical input power versus optical output power for two different biasing voltages of the first embodiment of the invention.
Figure 4:
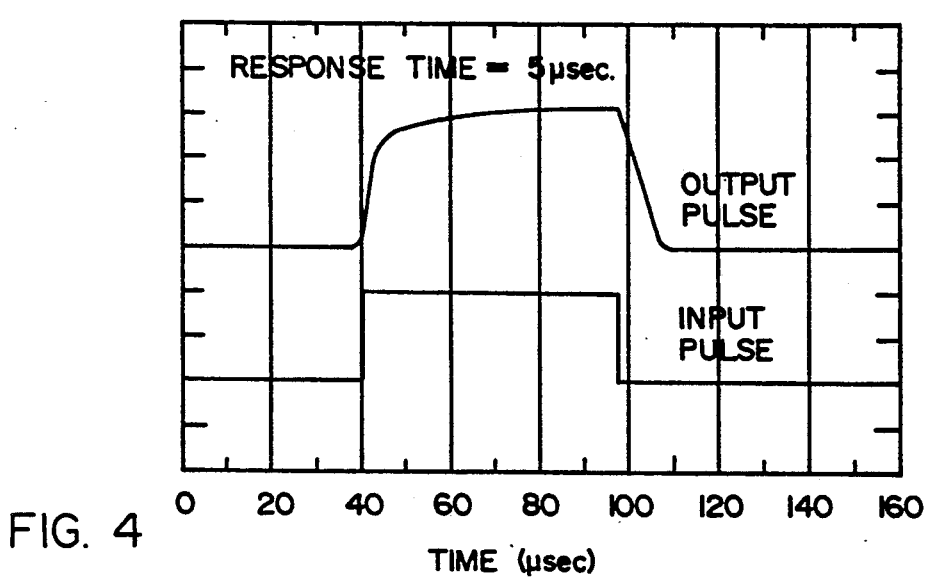
FIG. 4 is a graph illustrating the response time of the invention.

FIG. 3 shows the measured input-output characteristics of an optoelectronic neuron. A variable threshold controlled by the gate voltage of the biasing MESFET, $V_B$, is clearly evident in FIG. 3. For the curve at $V_B=-3$ V, the output initially remains close to zero for input up to 3 $\mu W$, then rises to 12 $\mu W$ within 2 $\mu W$ of input light power. This implies a differential optical gain of 6 in the neuron. The output of the neuron continues to rise gradually as the input increases further. The differential optical gain of 6 is limited by the leakage currents across the gate-drain schottky diodes in both MESFET's as well as the finite slopes in the I-V curves of the phototransistor and the biasing MESFET. With further reduction in the doping concentration in the MESFET's conduction n- layer and an increase in the doping concentration in the phototransistor's base layer, the optical differential gain can be further improved. It is noted that the output saturation levels for $V_B=-3$ V and $V_B=-2.4$ V curves are different owing to a higher common-emitter saturation voltage for the phototransistor, $V_{CE,SAT}$, and thus a smaller swing in the switching circuit for the $V_B=-2.4$ V curve. When characterized individually, the LED and the phototransistor are measured to exhibit efficiencies of 0.01 W/A and 1 A/W, respectively, and the transconductance of the MESFET's, $g_m$, is measured to be 20 mS/mm. The efficiencies in the LED and the phototransistor are limited by the thick p-GaAs layer in both devices, which causes self-absorption in the LED and the degradation in the current gain, $\beta$, of the phototransistor. It is expected that much improvement can be obtained by reducing the thickness of this layer. The current through the LED is about 1.2 mA, which implies, with $V_{DD}=2$ V, the electrical power consumption per neuron is about 2.4 mW. The response of the neuron is measured to be 5 $\mu sec$ as shown in FIG. 4, and is found to be limited by the charging of the capacitors in the circuits. With these results, the optical switching energy per neuron is thus calculated to be $(2\ \mu W)\times(5\ \mu sec)=10$ pJ.

Figure 5:
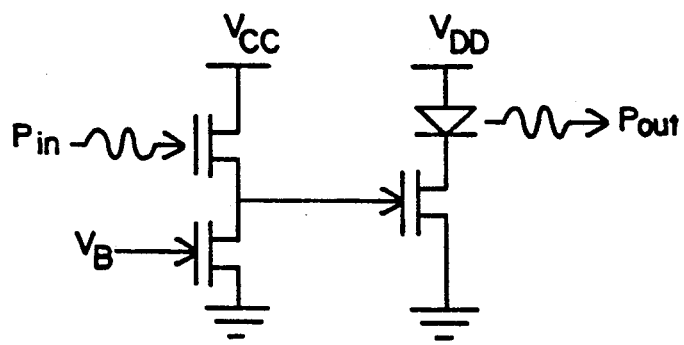
FIG. 5 is a schematic illustration of a second embodiment of the invention.

The circuit diagram of an alternative embodiment of the optoelectronic device of the present invention is shown schematically in FIG. 5. A switching circuit at the input is formed by connecting an optical FET (OPFET) in series with a biasing MESFET. Upon detecting enough incoming light, the OPFET pulls up the source-drain voltage across the biasing MESFET. This voltage turns on the other MESFET, which, in turn, drives the LED to emit light.

Figure 6:
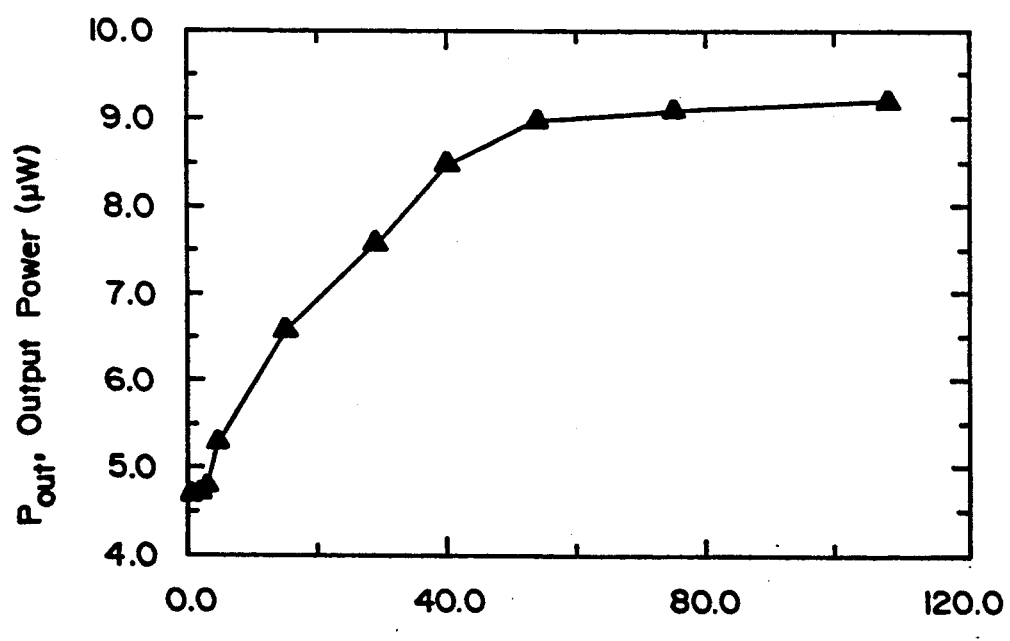
FIG. 6 is a graph of optical input power versus optical output power for the second embodiment of the invention.

FIG. 6 shows the measured input-output characteristics of the optoelectronic thresholding device with $V_B$ floating. A differential optical gain of 80 is observed as an input beam of 54 nW incident on the OPFET causes the LED to emit additional 4.3 $\mu W$. The differential optical gain of 80 is achieved as a result of an extremely sensitive input switching circuit formed by the OPFET and the MESFET in series with it. The current flowing through the LED when the device is saturated is 900 $\mu A$. With a power supply of 2 V, this implies the electrical power dissipation is 1.8 mW per device. This electrical power can be reduced by a factor of 2 by recessing the gate of the LED-driving MESFET further to the appropriate depth so that this MESFET does not conduct current when there is no optical input. The efficiency of the LED and the OPFET are 0.01 W/A and 0.3 A/W, respectively. The transconductance of the LED-driving MESFET is 60 mS/mm with a source-drain breakdown of 25 V. The rise and the fall times are measured to be 700 $\mu sec$ and 40 $\mu sec$, respectively. Thus, the optical switching energy can be calculated to be $(54\ nW)\times(700\ \mu sec)=38$ pJ. This is comparable to results for the embodiment of FIG. 1 of 10 pJ as the switching energy is expected to be the same for charging up the transistor of the same size. However, the second embodiment shows a substantially lower power (54 nW vs. 2 $\mu W$) needed to turn the LED on. This means higher sensitivities at the input, and thus overall higher optical gains for the optoelectronic thresholding devices.

It will now be understood that what has been disclosed herein comprises an integrated, optoelectronic, variable thresholding neuron implemented monolithically in a GaAs integrated circuit and exhibiting high differential optical gain and low power consumption. Two alternative embodiments each comprise an LED monolithically integrated with a detector and two transistors. One of the transistors is responsive to a bias voltage applied to its gate for varying the threshold of the neuron.

Having thus described two exemplary embodiments of the invention, what is claimed is:

1. An optoelectronic neuron comprising:
   a light detector;
   a first transistor in series connection with said light detector and having an output responsive to the detection of light by said detector;
   a second transistor connected to said output of said first transistor for switching on and off responsive to the voltage at said output; and
   a light source connected in series with said second transistor, said light source generating light whenever said second transistor is switched on.

2. The optoelectronic neuron recited in claim 1 wherein said first transistor has an input for receiving a biasing voltage, the magnitude of said biasing voltage establishing a selectively variable light threshold for said detector.

3. The optoelectronic neuron recited in claim 1 wherein said first and second transistor comprise metal-semiconductor field-effect transistors.

4. The optoelectronic neuron recited in claim 1 wherein said light detector comprises a double heterojunction bipolar phototransistor.

5. The optoelectronic neuron recited in claim 1 wherein said light detector comprises an optical field-effect transistor.

6. The optoelectronic neuron recited in claim 1 wherein said light source comprises a light-emitting diode.

7. The optoelectronic neuron recited in claim 1 wherein said light detector, said first and second transistors and said light source are integrated into a monolithic semiconductor structure.

8. The optoelectronic neuron recited in claim 7 wherein said semiconductor structure comprises GaAs.

9. A GaAs-based monolithically integrated optoelectronic neuron having variable thresholding for amplifying light detected above a selected threshold level; said neuron comprising:
 a light detector;
 a light source; and
 means interconnecting said detector and source for activating said source upon detection of light above said selected threshold.

10. The optoelectronic neuron recited in claim 9 further comprising means for adjusting said selected threshold.

11. The optoelectronic neuron recited in claim 9 wherein said light detector comprises a double heterojunction bipolar phototransistor.

12. The optoelectronic neuron recited in claim 9 wherein said light detector comprises an optical field-effect transistor.

13. The optoelectronic neuron recited in claim 9 wherein said light source comprises a light-emitting diode.

14. The optoelectronic neuron recited in claim 9 wherein said interconnecting means comprises first and second transistors, said first transistor being in series connection with said light detector and having an output responsive to the detection of light by said detector and said second transistor being connected to said output of said first transistor for switching on and off responsive to a voltage at said output; said light source being connected in series with said second transistor.

15. The optoelectronic neuron recited in claim 14 wherein said first transistor has an input for receiving a biasing voltage, the magnitude of said biasing voltage establishing a selectively variable light threshold for said detector.

16. The optoelectronic neuron recited in claim 14 wherein said first and second transistor comprise metal-semiconductor field-effect transistors.

* * * * *